Oct. 4, 1927.
F. W. CUTLER
1,644,052
SORTING AND GRADING DEVICE
Filed Sept. 2, 1925
3 Sheets-Sheet 1
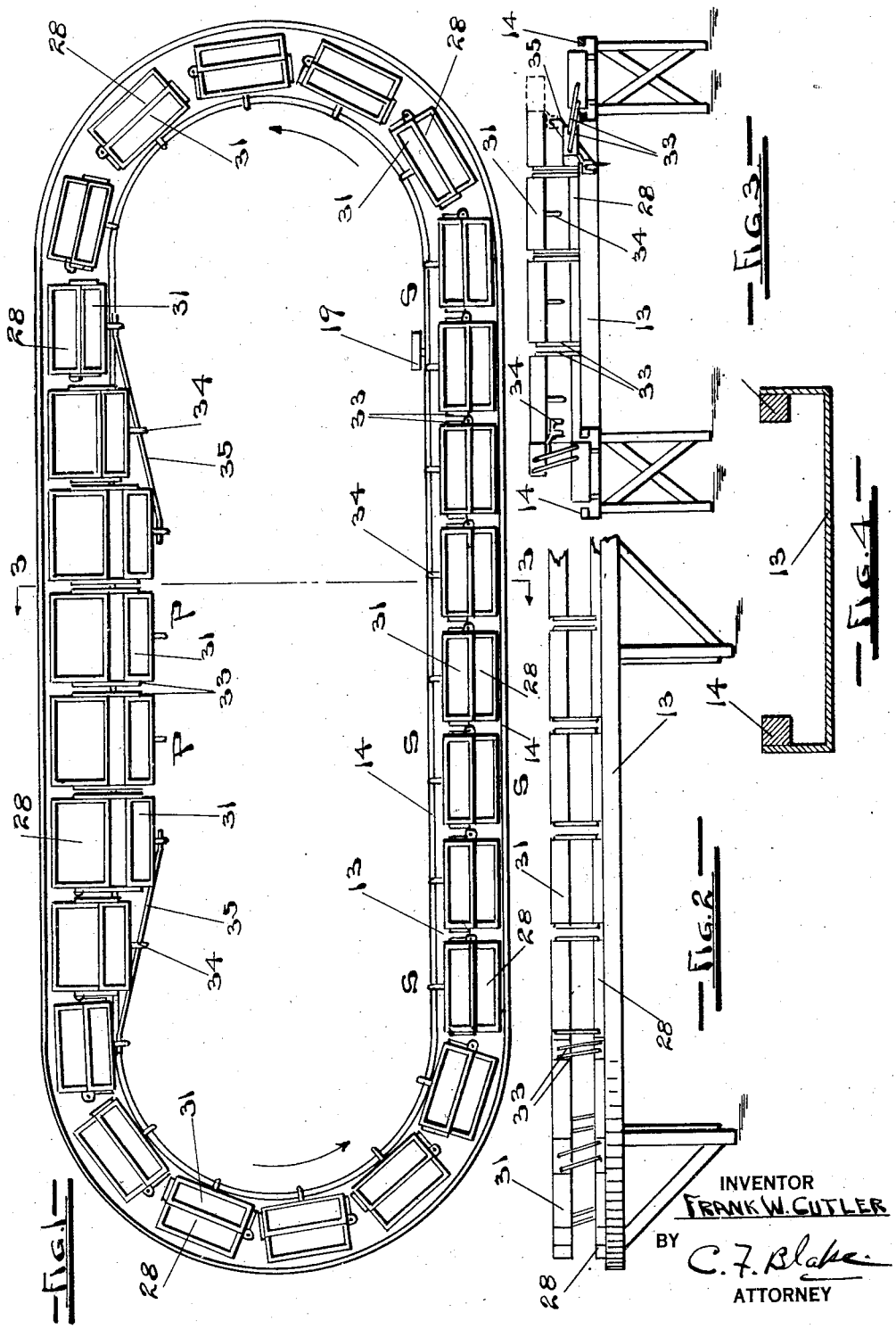
INVENTOR
FRANK W. CUTLER
BY C. F. Blake
ATTORNEY

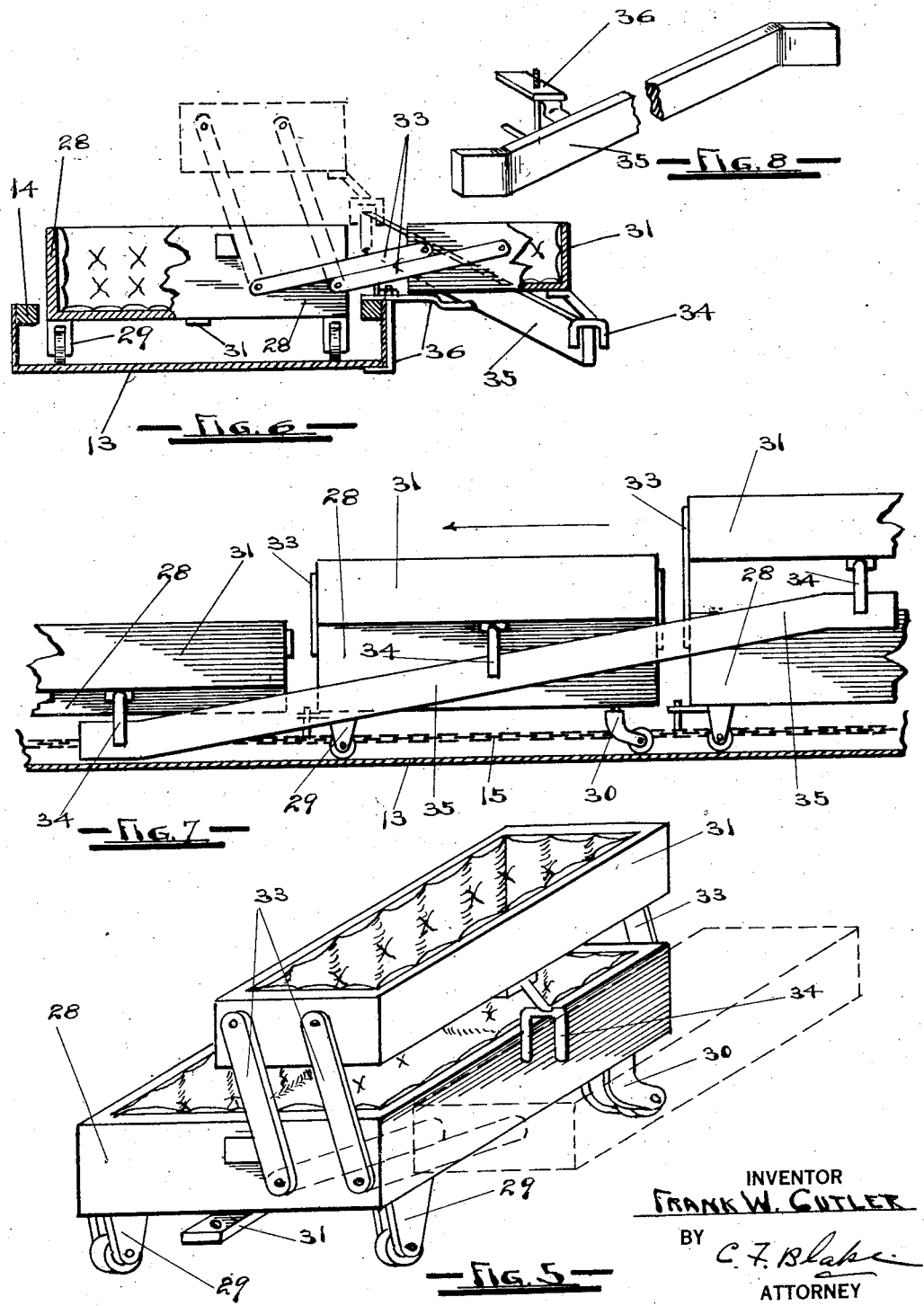

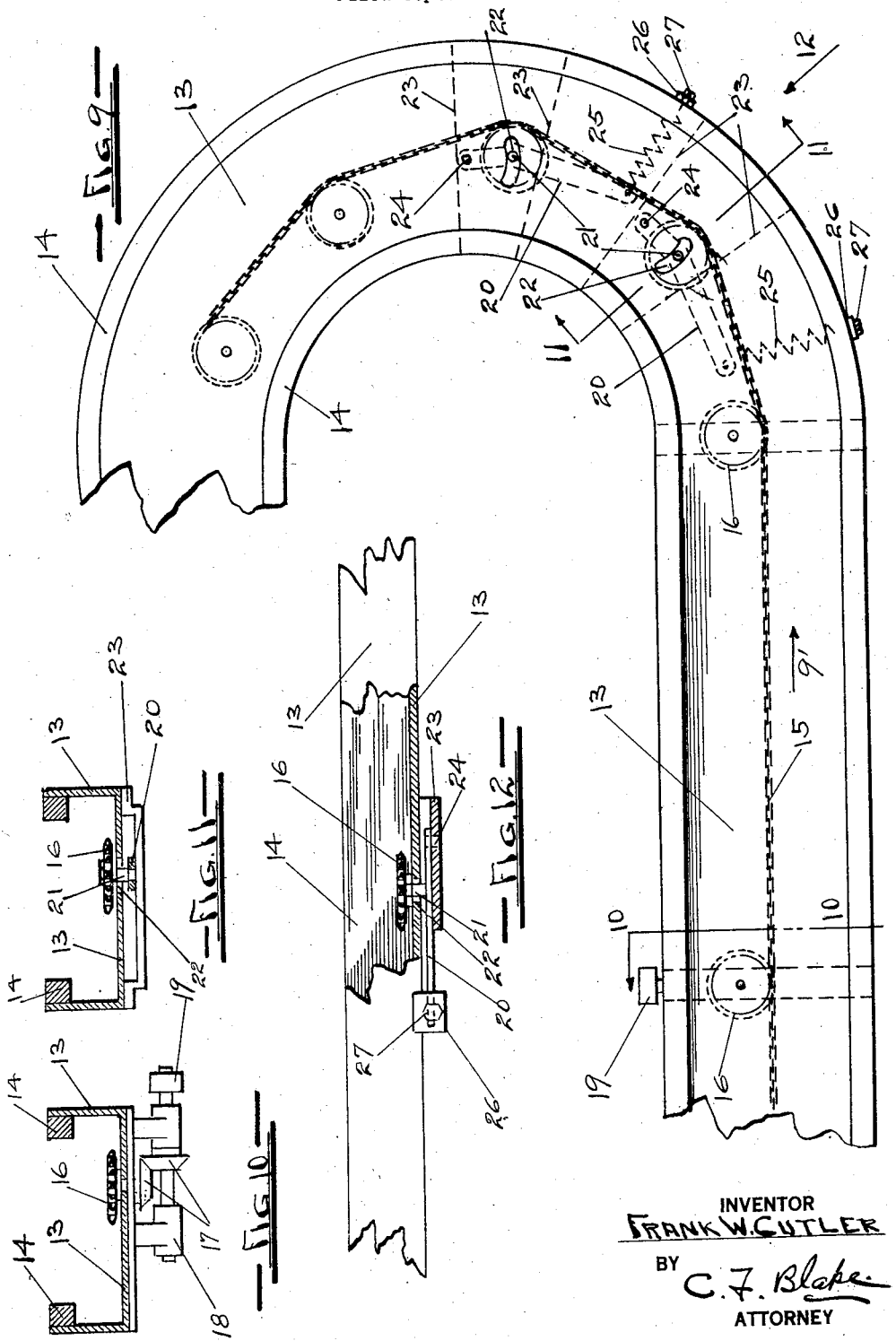

Patented Oct. 4, 1927.

1,644,052

UNITED STATES PATENT OFFICE.

FRANK W. CUTLER, OF PORTLAND, OREGON, ASSIGNOR TO CUTLER MANUFACTURING COMPANY, OF PORTLAND, OREGON, A PARTNERSHIP.

SORTING AND GRADING DEVICE.

Application filed September 2, 1925. Serial No. 54,072.

My device relates to sorting and grading devices in general, and particularly to such devices as are adapted for use with delicate and easily damaged fruits, such as pears and the like, the object being to provide a device for use in the sorting and packing of such fruits. I accomplish this object by means of the construction illustrated in the accompanying drawings, which are a part of this application for Letters Patent, like characters of reference indicating like parts throughout the several views thereof; and in which:

Fig. 1 is a plan view of my device.

Fig. 2 is a side elevation of one end thereof.

Fig. 3 is a section upon the line 3—3 of Fig. 1.

Fig. 4 is a transverse section of the track.

Fig. 5 is a perspective view of one of the carriages.

Fig. 6 is a sectional view of the track, showing one of the carriages in place thereon, and one of the carriage operating cams.

Fig. 7 is a longitudinal section of the track with carriages shown thereon, and one of the carriage operating cams.

Fig. 8 is a perspective view of one of the carriage operating cams.

Fig. 9 is a fragmentary view of the track, showing the drive chain tightening mechanism.

Fig. 10 is a section upon line 10—10 of Fig. 9.

Fig. 11 is a section upon line 11—11 of Fig. 9.

Fig. 12 is a fragmentary elevation of the track in the direction of the arrow 12 in Fig. 9, with parts broken away to illustrate the construction.

In general my device consists of an endless trough-like track with an endless flexible power transmitting member, such as a chain, traveling thereupon; carriages of novel construction including shiftable portions propelled around said track by means of said power transmitting member; cams adjustably positioned upon said track for operating the shiftable portions of said carriages; and a novel tightening device for said power transmitting member which enables the carriages to travel a practically undeviated path over said tightening device.

The endless track may be constructed in any convenient form, that shown in the drawings being a trough-like structure 13 rectangular in transverse sectional area as shown in Fig. 4, and having rails 14 upon the upper arms of said trough-like member, said rails being conveniently made of wood. The track is endless, and may be of any desired endless form, that shown being formed with two parallel sides joined by semicircular ends, as shown in Fig. 1. Traveling upon this track is an endless flexible power transmitting member 15, such as a chain or the like, carried by sprockets 16 mounted upon the track. One of said sprockets is driven by power transmitting machinery of any convenient construction, that shown being bevel gears 17, shaft 18, and pulley 19, the latter being connected to a source of power not shown in the drawings.

It is necessary to provide a tightening device for said chain 15, and such device should not require the carriages traveling upon the track to deviate from their path while passing the tightening device. This I accomplish by means of the construction shown in Fig. 9, by mounting one or more of the sprockets upon pivoted arms 20 to carry the stud pins 21 of the sprockets. These stud pins are projected upward through the track by providing slots 22 therein, and the sprockets are mounted rotatingly upon the upper ends of said stud pins, as shown in Figs. 11 and 12. A plate 23 is secured beneath the track to receive and support the stud pin 21. One end of the arm 20 is pivoted upon said plate 23 at 24, and the opposite end is attached to a spring 25, which spring is also attached to a depending bracket 26 by means of an adjusting nut 27. Through the medium of the pivoted arms 20 these springs position the respective sprockets thereupon so that the required tension is always maintained in the chain 15. This adjusting or tightening device is positioned upon the track upon the slack part of said chain, as shown by arrow 9' of Fig. 9, and the movement of each sprocket is so slight that taken with the freedom allowed each carriage upon the track, the carriages pass the tightening device with practically no deviation in their path of travel, and with no jar that will damage the delicate fruit thereupon.

There are a plurality of carriages traveling upon said track, each carriage being double decked or compartmented, the upper deck or compartment being shiftable relative to the lower. The lower compartment is preferably a rectangular box-like structure 28 provided with wheels adapted to travel upon said track. The front wheels may be mounted in suitable stationary brackets as shown at 29 in Fig. 5, but to allow the carriages to travel easily around the ends of the track the rear wheels are mounted in caster brackets 30. A draw bar 31 is pivoted upon each carriage and positioned to receive an upward projecting pin from the chain 15 whereby to propel the carriage. The upper compartment of each carriage is also a rectangular box-like structure 31, and is supported from the lower compartment 28 by means of parallel links 33 at each end thereof, as shown in Figs. 5 and 6.

At certain portions of the travel of the carriages where the sorters and graders are located it is desirable to have the compartments 28 and 31 in relative vertical positions, the latter above the former as shown in Fig. 5 and also at S in Fig. 1, because in packing plants the sorters and graders are positioned upon one side of the endless track upon which the carriages travel. Where the carriages pass the packers who remove the sorted fruit from the carriages and pack it into receptacles for shipment it is desirable to have the compartments in substantially the same horizontal plane as shown in Fig. 6 and also at P in Fig. 1, for the reason that the packers are positioned upon both sides of the track and therefore the lowered position of the upper compartment places the contents thereof most conveniently for the packers who remove the fruit therefrom. This is provided for by the carriage operating cams, and since it may be desirable to shift the positions of sorters and packers from time to time, or to accommodate the layout of the plant, these cams are adjustably positioned upon the device. The upper compartment of each carriage is provided with a cam engaging member, that shown in the drawings being simply a downwardly projecting inverted U shaped yoke 34 adapted to receive the operating cam between the arms thereof as shown in Fig. 6. The cams are conveniently constructed of bars 35 secured upon the track by adjustable brackets 36. These bars 35 enter the cam engaging member 34 of each carriage as the carriage arrives at the position of the bar 35, and each bar is bent so as to move the upper compartment of the carriage upon its links 33 from its vertical position as shown in Fig. 5 to its horizontal position as shown in Fig. 6, or vice versa. These bars 35 are also bent to follow the movement of the upper compartment 31 as caused by them, and to allow the cam engaging member 34 to rest upon the bar, as shown in Fig. 6, thereby eliminating all jar to the delicate fruit within the upper compartment that might otherwise injure the same when the compartment is moved upon its links 33.

Each carriage compartment is padded, and every precaution to prevent delicate fruit from damage is taken, as witness the combination of chain tightening mechanism and upper compartment moving mechanism, which together operate to prevent any undue jarring of the carriage as the same travels and performs its functions.

My device may be made of any size, and constructed of any materials deemed convenient and suitable for a device of this character, and while I have illustrated and described a form of construction and arrangement of parts found desirable in materializing my device, I wish to include in this application all mechanical equivalents and substitutes that may fairly be considered to come within the scope and purview of the appended claims.

Having disclosed my invention so that others may be enabled to construct and to use the same, what I claim as new, and desire to secure by Letters Patent is:

1. In a sorter and grader: a track; carriages adapted to travel upon said track, each carriage having a lower compartment and an upper compartment; a parallel motion device connecting said compartments; and adjustably positioned cam devices for moving the upper compartment relatively to the lower compartment at certain points of travel of the carriage.

2. In a sorter and grader: a traveling carriage; upper and lower compartments upon said carriage; parallel motion links connecting said compartments; a cam positioned to effect relative movement of said compartments as said carriage travels therepast; and a cam engaging member upon the upper of said compartments.

3. In a sorter and grader: a plurality of double compartmented carriages; an endless flexible member for propelling said carriages; and a tightening device for said member adapted to function without interference with the path of travel of said carriages.

In witness whereof I claim the foregoing as my own I hereby affix my signature at Portland, county of Multnomah, State of Oregon, this 18th day of August, 1925.

FRANK W. CUTLER.